United States Patent [19]

Redman

[11] Patent Number: 4,892,897
[45] Date of Patent: Jan. 9, 1990

[54] COATING COMPOSITIONS

[75] Inventor: Richard P. Redman, Reading, England

[73] Assignee: Imperial Chemical Industries PLC, London, England

[21] Appl. No.: 193,096

[22] Filed: May 12, 1988

[30] Foreign Application Priority Data

May 28, 1987 [GB] United Kingdom ............... 8712577

[51] Int. Cl.$^4$ .......................... C08K 3/20; C08L 63/00
[52] U.S. Cl. .................... 523/404; 204/181.7; 523/402
[58] Field of Search .............. 523/404; 204/181.7

[56] References Cited

U.S. PATENT DOCUMENTS

| | | | |
|---|---|---|---|
| 4,248,978 | 2/1981 | de Cleur et al. | 525/124 |
| 4,296,010 | 10/1981 | Tominaga | 528/45 |
| 4,615,779 | 10/1986 | McCollum et al. | 428/418 |

FOREIGN PATENT DOCUMENTS

| | | | |
|---|---|---|---|
| 0005230 | 11/1979 | European Pat. Off. | |
| 0104424 | 4/1984 | European Pat. Off. | |
| 0200397 | 5/1986 | European Pat. Off. | |
| 0229459 | 7/1987 | European Pat. Off. | |
| 2113802 | 10/1986 | United Kingdom | 523/404 |

Primary Examiner—Lewis T. Jacobs
Attorney, Agent, or Firm—Cushman, Darby & Cushman

[57] ABSTRACT

A coating composition comprising:
(i) a non-gelled amine-epoxide reaction product having units derived from:
 (a) at least one secondary amine
 (b) optionally a primary amine
 (c) units derived from a polyepoxide;
 (d) optionally capping units for the polyepoxide
 (e) optionally units derived from a polyoxyalkylene polyamine; and
 (f) optionally units derived from a monoepoxide;
(ii) a liquid crosslinker being a mixture of 4,4-diphenylmethane diisocyanate and 4,4-diphenyl methane diisocyanate uretonimine derivative having the formula (3):

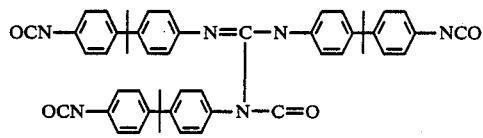

and a mono alcohol;
(iii) an aqueous carrier for the composition.

15 Claims, No Drawings

COATING COMPOSITIONS

This invention relates to new coating compositions, to a process for their preparation and their use in cathodic electrodeposition.

European Patent Application No. 200397 discloses coating compositions comprising particular non-gelled amine-epoxide reaction products and a capped isocyanate crosslinker.

The use of capped isocyanates for the crosslinking of aminated epoxy resins as used in cathodic electrodeposition systems is well known and has been used commercially for several years.

Many different isocyanates and capping groups have been disclosed but in practice most commercial products are based on aromatic isocyanates, and in particular tolylene diisocyanate, capped with aliphatic alcohols and/or polyols. During the heat curing of the coated film and the subsequent topcoats, decomposition products are formed from such tolylene isocyanate based system which can cause yellow staining of the topcoats. One way of overcoming this defect is by the use of the so called "non-yellowing" or aliphatic polyisocyanates. However, crosslinkers obtained by alcohol capping of these aliphatic isocyanates require far higher curing temperatures than the conventional aromatic isocyanates and the aliphatic isocyanates are also considerably more expensive.

GB 2051072 discloses the use of aromatic isocyanates containing at least two benzene rings for the preparation of capped isocyanate crosslinkers useful in cathodic electrodeposition. They do not give rise to the yellow staining on subsequent topcoats. The most readily available commercial products of this type are 4,4'-diphenylmethane diisocyanate (MDI) and the crude undistilled precursor of 4,4'-diphenylmethane diisocyanate which contains a mixture of di, tri and higher functionality isocyanates (crude or polymeric MDI).

It has been found, however, that neither of these commercially available MDI types are entirely suitable for the production of alcohol capped crosslinkers for cathodic electrodeposition systems.

Pure MDI is a crystalline solid and the derived capped crosslinkers are also crystalline solids. Such crystallinity gives rise to problems in the stability of the aqueous emulsions derived from these crosslinkers. Over a period of time the crosslinkers crystallise within the droplets of the emulsion and destabilise the emulsion. This gives rise to "bits" in the paint and ultimately to the formation of a "sludge" in the paint tank.

Crude MDI is a brown liquid and the crosslinkers derived from it do not generally show a significant degree of crystallinity because of the mixture of products present.

European Pat. No. 192113 in fact teaches the use of such unrefined MDI to provide crosslinkers with reduced a crystallinity. However, because the isocyanate is an undistilled product it contains significant levels of bi-products formed during the manufacture by phosgenation of the corresponding amines. In particular, the crude MDI contains a high level of hydrolysable chlorine containing species (typically the hydrolysable chlorine content is 0.2-0.5% compared to about 10 parts per million for the distilled pure MDI). This high level of hydrolysable chlorine gives rise to problems during the electrodeposition process by the formation of hydrochloric acid at the anodes. This gives rise to considerable difficulty in controlling an electrocoat tank with excessive flushing of the anolyte boxes to maintain satisfactory performance.

It has now been found that both of these problems can be overcome by the use of uretonimine modified pure MDI, the uretonimine derivative being present in an amount such that the mixture is liquid at room temperature.

Such crosslinkers when used with any conventional epoxy-amine electrodeposition system give rise to systems with excellent tank stability and non-yellowing characteristics.

According to the present invention, there is provided a coating composition comprising:

(i) a non-gelled amine-epoxide reaction product having units derived from:

(a) at least one secondary amine of formula (1):
$$R^1R^2NH \qquad (1)$$

where $R^1$ and $R^2$ are the same or different and are amino- or protected amino-$C_{2-6}$alkyl, optionally substituted $C_{1-18}$alkyl or $C_{5-8}$cycloalkyl or $R^1$ and $R_2$ together with the nitrogen atom to which they are attached represent an optionally substituted five, six or seven membered heterocyclic group where, in each case, the optional substituent is one or more $C_{1-4}$ alkyl groups, $C_{1-4}$alkoxy groups or hydroxy groups;

(b) optionally a primary amine of formula (2):
$$R^3NH_2 \qquad (2)$$

where $R^3$ is $C^{1-18}$alkyl or $C^{5-8}$cycloalkyl optionally substituted with amino, di-$C_{1-4}$alkylamino, morpholino or piperazino;

(c) units derived from a polyepoxide;

(d) optionally capping units for the polyepoxide;

(e) optionally units derived from a polyoxyalkylene polyamine; and (f) optionally capping units for either the primary amine (b) or for the polyoxyalkylene polyamine (e), the capping units being derived from a monoepoxide;

(ii) a crosslinker for the amine-epoxide reaction product, the crosslinker being a mixed reaction product derived from a diol and/or a triol; a mixture of 4,4'-diphenylmethane diisocyanate and 4,4'-diphenylmethane diisocyanate uretonimine derivative having the formula (3):

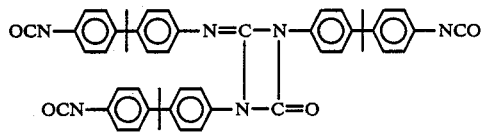

(the compound of formula (3) being, present in an amount such that the mixture of 4,4'-diphenylmethane diisocyanate and the uretonimine derivative is liquid at room temperature) and a monoalcohol or caprolactam; and (iii) an aqueous carrier for the composition.

Examples of amino- and protected amino-$C_{2-6}$alkyl groups for $R^1$ and $R^2$ are 2-aminoethyl, 3-aminopropyl, 4-aminobutyl and 6-aminohexyl; and the corresponding di-$C_{1-6}$alkyl or cyclo-$C_{5-6}$ alkylketimine derivatives; especially 2-aminoethyl and its methyl isobutylketimine derivative.

Examples of $C_{1-18}$ alkyl groups for $R^1, R^2$ and $R^3$ are methyl, ethyl, n-propyl, iso-propyl, n-butyl, pentyl, hexyl, decyl, dodecyl, hexadecyl, and octadecyl.

Examples of cycloalkyl groups for $R^1$, $R^2$ and $R^3$ are cyclopentyl and cyclohexyl.

Examples of heterocyclic systems that are represented by $R^1$ and $R^2$ taken together with the nitrogen atom to which they are attached are pyrrolidine and piperidine.

Examples of optional $C_{1-4}$ alkyl substituents for $R^1$ and $R^2$ are methyl, ethyl and n-propyl.

Examples of optional $C_{1-4}$ alkoxy substituents for $R^1$ and $R^2$ are methoxy, ethoxy and n-propoxy.

Examples of hydroxy substituted $C_{1-18}$ alkyl groups are 2-hydroxyethyl, 3-hydroxypropyl and 4-hydroxybutyl. Particularly 2-hydroxyethyl.

Examples of $C_{1-4}$ alkoxy substituted $C_{1-18}$ alkyl groups are 2-methoxyethyl, 3-methoxypropyl and 4-methoxybutyl.

Examples of amino substituted $C_{1-18}$ groups for $R^3$ are 2-aminoethyl, 3-aminopropyl, 4-aminobutyl, 6-aminohexyl, 10-aminodecyl and 12-aminododecyl.

Examples of di-$C_{1-4}$ alkylamino substituted $C_{1-18}$ alkyl groups for $R^3$ are N,N-dimethylaminoethyl, N,N-diethylaminoethyl, N,N-dimethylaminopropyl, N,N-dimethylaminobutyl, and N,N-dimethylaminohexyl. Examples of di-hydroxy-$C_{1-4}$ alkylamino substituted $C_{1-18}$ alkyl groups for $R^3$ are N,N-dihydroxyethylaminoethyl, N,N-dihydroxyethylaminopropyl and N,N-dihydroxyethylaminohexyl.

Examples of morpholino or piperazino substituted $C_{1-18}$ alkyl groups for $R^3$ are N-morpholinopropyl, N-morpholinobutyl, N-morpholinohexyl and N-methyl-N-piperazinoethyl, N-methyl-N-piperazinopropyl, N-methyl-N-piperazinobutyl and N-methyl-N-piperazinohexyl.

Examples of polyepoxides include polyglycidylethers of polyphenols, especially those having an epoxide equivalent in the range 150 to 2500, and more especially in the range 400–1000. Particular examples of such polyepoxides are those derived from epichlorhydrin and bis(4-hydroxyphenyl)-2,2-propane. These polyepoxides can be regarded as having the idealised structural formula (4):

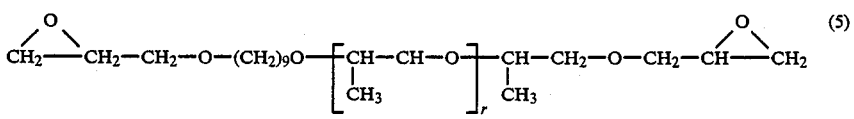

where p is an integer such that the polyepoxide has an epoxide equivalent within the above range.

Polyepoxides of this type are available under the Trade Mark "Epikote", in particular Epikote 1001, 1004 and 1007.

Another class of polyepoxides are the glycidyl ethers of polypropylene glycol having an epoxide equivalent in the range 150 to 350. Such polyepoxides have the general formula (5):

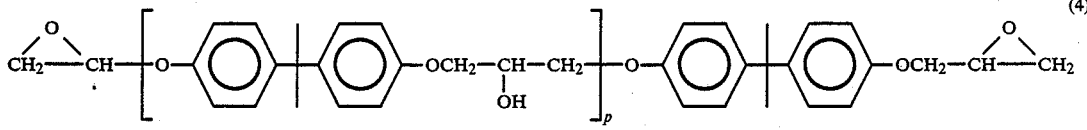

where $O(CH_2)_9O$ is the residue of an aliphatic diol and r is an integer such that the epoxide of formula (5) has an epoxide equivalent of 150 to 350.

Polyepoxides of this class are commercially available from Dow Chemicals as DER 732 and 736.

A further class of polyepoxide for use in this invention consists of "advanced" or chain extended polyepoxides obtained by reacting a polyepoxide of formula (4) with an organic polyol, such polyepoxides have the general formula (6):

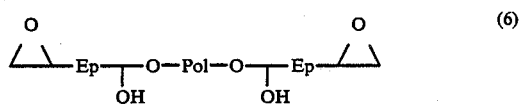

where Ep is the residue of an epoxide of formula (4) and pol is the residue of an organic polyol.

The polyol can be a simple $C_{2-18}$ alkane diol for example, ethane-1,2-diol, propane-1,3-diol, butane-1,4-diol, hexane-1,6-diol, octane-1,8-diol and decane-1,10-diol.

The polyol can also be a polyether polyol of formula (7):

$$H\text{-}[O(CH_2)_n]_m\text{-}OH \qquad (7)$$

where n is from 2 to 6 and m is from 2 to 100; especially polyoxytetramethylene glycols having molecular weights in the range 500 to 3000.

A further class of polyether polyol has the general formula (8):

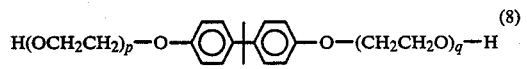

where p and q are nominally from 2 to 5. Such compounds are commercially available under the Trade Mark Dianol. For example, Dianol 22 where p and q are both 2, Dianol 2211 which is a mixture of isomers such that p+q is 4, Dianol 2213 where p+q is 6.5 and Dianol 2214 where p+q is 8.5.

The polyol can also be a polycaprolactone diol of formula (9):

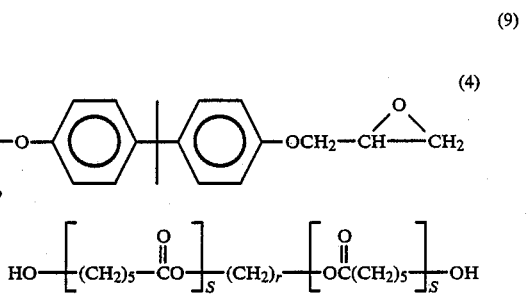

where r is from 1 to 6 and s is a number such that the molecular weight of the diol is from 530 to 2000.

Examples of the optional monoepoxide-derived units include higher alkyl glycidyl esters in particular $C_{6-12}$ esters and $C_{4-12}$ alkyl and phenyl or $C_{1-6}$ alkyl phenyl glycidyl ethers. Examples of such ethers include butylglycidylether, 2-ethylhexylglycidylether, phenylglycidylether and cresylglycidylether. Examples of such esters include the hexyl, octyl, nonyl, decyl and dodecyl esters. Preferably the alkyl group is a branched alkyl group. One such ester, a branched $C_9$-ester, is available under the Trade Mark "Cardura".

Examples of the optional capping units for the polyepoxide are carboxylic acids and phenols.

Examples of carboxylic acids that can be used in this way are aromatic acids especially benzoic acid and $C_{2-20}$ alkanoic acids, for example acetic acid, propionic acid, dimethylpropionic acid, decanoic acid, dodecanoic acid and stearic acid.

Examples of phenols that can be used in this way are $C_{1-10}$ alkyl substituted phenols (particularly t-butylphenol and nonylphenol) and arylphenols and other substituted phenols (particularly phenylphenol, napthanol, nitrophenol and chlorophenol). Preferably the capping group is nonylphenol.

The amine-epoxide adduct is of course a complex mixture of compounds.

In its simplest form, it can have an idealised structural formula (10):

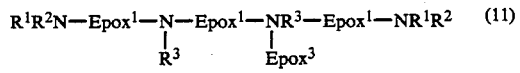

where $R^1$ and $R^2$ are as defined with reference to formula (1) and $Epox^1$ is the residue of a polyepoxide. One particular sub-class within this simplest form is where one residue $R^1R^2N$- is different from the other. In the one residue, $R^1$ is $C_{1-6}$ alkyl particularly methyl and $R^2$ is hydroxy $C_{1-6}$ alkyl particularly 2-hydroxyethyl and in the other residue, $R^1$ and $R^2$ are the same and are amino-$C_{2-6}$ alkyl particularly 2-aminoethyl. Within this sub-class $Epox^1$ is the residue of an advanced epoxide.

Another particular class of amine-epoxide adduct has general formula (11):

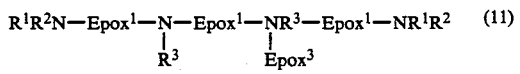

where the residues $R^1R^2N$- are the same and $R^1$ and $R^2$ both represent hydroxy $C_{2-6}$ alkyl especially hydroxyethyl, $Epox^1$ is the residue of a polyepoxide;

represents the residue of a di-$C_{1-6}$ alkylamine-$C_{2-6}$ alkylamine, especially dimethylaminopropyl amine;

represents the residue of a capped $C_{2-6}$ alkane diamine of formula (12):

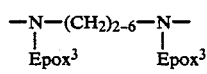

where $Epox^3$ is the residue of a monoepoxide. In particular, the $C_{2-6}$ alkanediamine is ethane-1,2-diamine.

A preferred class of amine-epoxide adduct can, for simplicity be regarded as having the idealised structural formula (13):

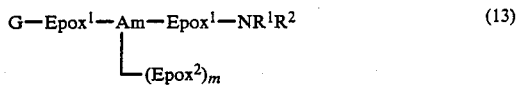

where $R^1R^2N$ is the residue of the secondary amine of the formula (1), Am is a polyoxyalkylenepolymaine, $Epox^1$ is a polyepoxide, $Epox^2$ is a monoepoxide and G is the optional capping group.

In the idealised structural formula (13), one polyepoxide-derived unit is shown as being half capped.

Where the polyepoxide $Epox^1$ has a nominal 1,2-functionality as for example with Epikote, then the amount of capping can be 15-35% and is more preferably 20-30%.

Preferably, the epoxide is capped. This is because capping contributes to the stability of the composition.

The polyoxyalkylene polyamine can be a diamine or a triamine or a mixture of a diamine and triamine, and the amine group can be primary or secondary. Preferably the amine group is a primary amine. Where the amine is a primary amine it has two reactive hydrogen atoms capable of reacting with an epoxide group. Thus a primary diamine has a functionality of four and a triamine has a functionality of six. However the reactivity of the first hydrogen is greater than the second. Preferably the amines for use in this invention have a functionality of two and three respectively.

Examples of polyoxyalkylene diamines that can be used in the compositions of this invention are:

3,3-[1,2-ethanediyltris(oxy)]bis1-propanamine or 4,7-dioxadecane-1,10-diamine, polyoxypropylenediamine 3,3-[1,4 butanediylbis(oxy)]bis-1-propanamine or 4,9-dioxadodecane-1,12-diamine, 3,3-[oxybis(2,1-ethanediyloxy)]bis-1-propanamine or 4,7,10-trioxatridecan-1,13-diamine and bis(3-aminopropyl)polytetrahydrofuran 750, 1100 and 2100.

A further particular class of polyoxyalkylene polyamines within the scope of this invention consists of diamines of the general formula (14)

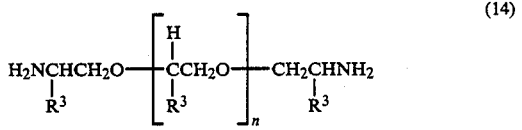

where $R^3$ is hydrogen or $C_{1-6}$ alkyl and n is an integer from 1 to 50.

Polyoxyalkylene diamines of this type are commercially available under the Trade Mark "Jeffamine" from the Jefferson Chemical Company. Examples of particular Jeffamines are Jeffamine D400 and Jeffamine D-2000.

Another particular class of polyoxyalkylene polyamines within the scope of this invention has the general formula (15):

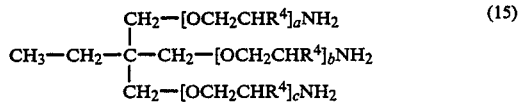

(15)

where $R^4$ is hydrogen or a $C_{1-6}$ alkyl group and a, b and c are integers such that their sum is from 3 to 30. For example, $R^4$ can be methyl, ethyl or propyl.

Amines of formula (15) are commercially available for example from the Jefferson Chemical Company under the Trade Mark "Jeffamine". The compounds are supplied commercially as mixtures of amines so that the sum of a, b and c will in practice be a mean value and so will be a non-integer or fractional value in the range 3 to 30. An example of a triamine of formula (15) is Jeffamine T403. Here, $R^4$ is methyl and the sum of a, b and c is 5.3.

As well as the non-gelled amine-epoxide reaction product based on the secondary amine of formula (1), the polyepoxide which is optionally capped and polyoxyalkylenepolyamine, there can be included in the composition, a second amine-epoxide reaction product of the same general type where the polyoxyalkylene polyamine has been replaced by a primary amine. This optional second product can be regarded as having the idealised structural formula (16):

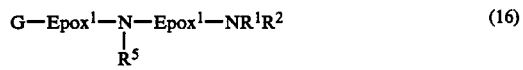

(16)

where $R^1R^2N$, $Epox^1$ and G are as defined with reference to formula (13) and $R^5$ is the residue of a primary amine where any substituents within $R^5$ are substantially inert to reaction with epoxide. Any substituents within $R^5$ are substantially inert in the sense that the amino group reacts preferentially with the epoxide groups.

Examples of substituents $R^5$ are $C_{2-20}$alkyl particularly butyl, hexyl, decyl, dodecyl; the residue of a reduced fatty acid particularly the residue of reduced coconut fatty acid amide; hydroxy-substituted $C_{2-20}$alkyl groups particularly hydroxyethyl, hydroxypropyl, and hydroxybutyl and tertiary amino substituted $C_{2-20}$alkyl groups for example where the amino substituent is di-$C_{1-6}$alkylamino, hydroxy di-$C_{1-6}$alkylamino or is a 5 or 6 membered heteroalicyclic group.

Particular tertiary amine substituents are dimethylamino, diethylamino, dipropylamino, dibutylamino, dihydroxyethylamino, dihydroxypropylamino, dihydroxybutylamino, pyrrolidino and morpholino.

The crosslinker for the amine-epoxide reaction product is a mixed reaction product having units derived, from a diol and/or triol; units derived from 4,4'-diphenylmethane diisocyanate: the uretonimine derivative of 4,4'-diphenylmethane diisocyanate and having the formula (3); and a monoalcohol.

The diol can be a simple straight or branched chain $C_{2-12}$alkane diol group or a polymeric species in particular one derived from polyethylene glycol or polypropylene glycol of molecular weight at least 100 and less than 1000.

In particular, the diol is derived from polyethylene glycol of molecular weight 200 and polypropylene glycol of molecular weight 400.

The triol can be a simple straight or branched chain $C_{3-12}$ alkane triol for example, glycerol or trimethylolpropane. In particular the triol is trimethylolpropane.

The mono alcohol can be a simple straight or branched $C_{1-12}$alkanol for example, methanol, ethanol, propanol, butanol or hexanol, or a $C_{1-12}$alkanol spaced from the isocyanate derived unit by a polyalkylene unit in particular, a di or tri-ethyleneoxy unit. Preferably the monoalcohol derived unit is derived from butoxyethoxyethanol.

The crosslinker is of course a complex mixture of reaction products. However, for simplicity and convenience, it can be visualised as being a mixture of two principal components which have the idealised structural formulae (17) and (18) below.

(17)

In formula (10) $A^1$ is a structural unit derived from a triol;

$B^1$ is a structural unit derived from 4,4'-diphenylmethane diisocyanate; and $A^2$ is a structural unit derived from a monoalcohol or caprolactam; and n is 0 or 1 depending on whether $A^1$ is a diol or triol.

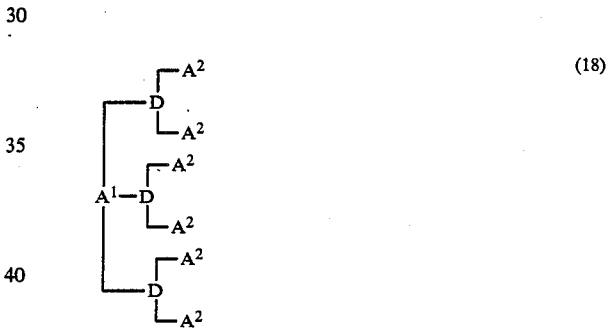

(18)

In formula (18) $A^1$, $A^2$ and n are as defined with reference to formula (17) and D is a structural unit derived from the uretonimine derivative of 4,4'-diphenylmethane diisocyanate.

The compound of formula (17) is present in an amount such that the mixture of the compounds of formulae (17) and (18) is from 90:10 to 10:90. Preferably, it is from 75:25 to 25:75.

The components of the crosslinker can be present in a range of molar proportions. In relation to the diol or triol component, the molar proportion is considered in terms of the molar amount of hydroxyl groups. Similarly, with regard to the mixture of 4,4'-diphenylmethane diisocyanate and the uretonimine derivative, the molar proportion is considered in terms of the molar amount of isocyanate groups.

Typically, the molar ratios are NCO:OH (diol and/or triol):OH(monoalcohol) 1:0.75–0.25:1–0.25.

The ratio of crosslinker to epoxy-amine adduct will in practice be in the range 10:90 to 60:40; preferably 20:80 to 50:50. When the optional second adduct, that is the formula (13)-type adduct is present, this ratio is based on the total epoxy-amine adduct.

The compositions of this invention consist of dispersions in aqueous media. The resins can be stabilised in aqueous media by addition-salt forming acids that form addition-salts with the epoxyamine adduct. The acid in question can be an inorganic or organic acid. An example of an inorganic acid is phosphoric acid. Examples of organic acids are formic acid, acetic acid and lactic acid.

The compositions can also comprise other components that are standard in aqueous coating compositions. For example, it can contain an auxiliary film-former in addition to the amine-epoxide reaction product. The auxiliary film-former can be present in an amount by weight less than or equal to the amine-epoxide reaction product. Examples of auxiliary film-formers are acrylic and vinyl polymers, alkyd resins, polyesters and polyurethanes. The auxiliary film-former preferably bears groups, for example hydroxyl groups, that react with the crosslinker.

Other additives that can be present in the composition are adhesion promoters, anti-crater agents, a catalyst for the crosslinking reaction, surfactants, pigments and coalescing solvents.

The compositions of the invention can be made by blending the ingredients with an aqueous vehicle, for example, water, an aqueous buffer or aqueous alcohol an emulsifying the mixture so obtained.

The non-gelled amine-epoxide reaction product can be made by known methods, for example as described in European Patent Application No. 200397.

The crosslinking agent, mixture can be prepared by reacting a mixture of 4,4'-diphenylmethane diisocyanate and the corresponding uretonamine sequentially or simultaneously with the monoalcohol, and then with the triol.

Mixtures of 4,4'-diphenylmethane diisocyanate and the corresponding uretonimine are available commercially under the Trade Mark "Suprasec VM20".

The compositions of the invention can be prepared by dispersing the amine-epoxide reaction product with the crosslinker and aqueous carrier.

The compositions of this invention can be applied to a conductive substrate by electrodeposition.

Accordingly, the invention also provides a process for coating a conducting substrate which comprises immersing the substrate to be coated in a composition according t the invention and passing a current between the substrate as cathode and a counter electrode as anode.

The electrodeposition process is carried out at a current density of in the range 0.1 to 10 milliamps cm$^{-2}$ of the surface area of the substrate and the voltage is 200 to 500 volts.

The deposition process is typically carried out at a temperature of between 10° and 40° C., usually 20 to 35° C. and preferably at 28° C.

In practice the deposition process is carried on for 1 to 3 minutes, preferably 2 minutes.

After the deposition step has been completed, the substrate is removed, rinsed with demineralised water and stoved to ensure that the reaction between the crosslinker and film-former proceed to completion. Typically the stoving step is carried out at 160° to 190° C. for 15 to 30 minutes.

The following Examples, where parts means parts by weight, illustrate the invention.

EXAMPLE

Example 1

Preparation of Uretonimine-containing crosslinkers 1.1 (a) A mixture of dibutyl tin dilaurate (0.24 parts) and methoxypropoxypropanol (488 parts, supplied by Dow Chemicals under the Trade Mark Dowanol DPm) was added to a mixture of 4,4'-diphenylmethane diisocyanate and the uretonimine adduct (570 parts, supplied by ICI Polyurethanes under the Trade Mark "Suprasec VM20") and the mixture maintained at 45°-50° C. for 1 hr. The half capped product so obtained was diluted with methylisobutylketohe (240 parts).

(b) Molten trimethylolpropane (120 parts) was added over 1 hour to the diluted half capped product of Example 1.1(a) above with stirring over 1 hr. During the addition, the temperature was allowed to rise to 120° C. When the addition was complete, a further portion of methylisobutylketone (200 parts) was added to the mixture and the mixture so obtained was maintained at 120° C. for a further 1 hr. The product so obtained was a clear solution of fully capped isocyanate having a solid content of 73% and showed no signs of crystallisation on prolonged storage.

1.2(a) Dibutyl tin dilaurate (6.24 parts) and butoxyethoxy ethanol (486 parts) were added to a mixture of 4,4'-diphenylmethane diisocyanate and its uretonimine adduct (870 parts) over 1 hour whilst maintaining the temperature of the reaction mixture at 15°-50° C. The temperature of the reaction mixture was kept at 50° C. for a further 1 hour. Thereafter, more molten trimethylolpropane (134 parts) were added over 1 hr. and the temperature of the reaction mixture was allowed to rise to 90° C. The reaction mixture was maintained at 90° C. for a further 1 hr and was then diluted with ethylcellosolve (600 parts).

The product obtained was a clear solution of a fully capped isocyanate having a solids content of 70% and showed no signs of crystallisation on prolonged storage.

1.3 A crosslinker was prepared according to the process of Example 1.2 above but replacing ethylcellosolve (600 parts) with butanol (600 parts).

1.4-1.14 Using the process of Example 1.1 above, capped isocyanate crosslinkers were prepared using the reagents set out in Table 1.

Example 2

Preparation of Epoxy Resins and Epoxy Resin-Crosslinker Emulsions 2.1 (a) Bisphenol A (243 parts) and bisphenol A/epichlorhydrin polyglycidylether (805 parts, having an epoxide equivalent about 198; Epikote 880), and triphenylethylphosphonium idodide (1 part) were mixed and heated to exotherm. After 15 minutes polycaprolactone diol (265 parts, commercially available from Union Carbide Corp. as PCP 0200 average molecular weight 530) and xylol (39 parts) were added to the reaction mixture. The mixture so obtained was heated at reflux for 30 minutes, cooled to 140° C., benzyl dimethylamine (3.85 parts) added and the mixture so obtained heated at 130° C. for 2.5 hours.

(b) Crosslinker (1200 parts) prepared as described in Example 1.2 was added to the reaction mixture, which was then cooled to 110° C. Thereafter, methylethanolamine (64 parts) and a solution of diethylene triamine-methylisobutyl diketimine (70% non-volatile) in methyl isobutylketone was added to the reaction mixture and the mixture was maintained at 115° C. for 1 hr. The mixture was diluted with ethylene glycol monohexylether (208 parts) and heated at 115° C. for a further 1 hr.

(c) A portion of the reaction mixture (2350 parts), prepared as described in paragraph 2.1 (b) above, was blended with glacial acetic acid (25 parts), an acetylenic alcohol (Surfynol 104; 18.3 parts), and a special cationic dispersant (45.8 parts) and de-ionised water (2144 parts).

(d) The cationic dispersant was prepared by blending an alkyl imidazoline commercially available as Geigy Amine C (761 parts), glacial acetic acid (171 parts), ethylene glycol monobutyl ether (761 parts) and deionised water (2109 parts).

2.2 (a) Diethanolamine (261 parts) was added to a solution of a preheated (80° C.) bisphenol-A:epichlorhydrin epoxy resin having an epoxy equivalent weight of 473 (3880 parts; commercially available as Epikote 1001 from Shell Chemicals) in butanol (2200 parts) and the temperature of the reaction mixture maintained at 80° C. for 1 hr. Thereafter, a blend of dimethylaminopropylamine (124 parts) and a Cardura E/hexanediamine adduct (761 parts; prepared as described in paragraph (b) below) in butanol (20 parts) were added to the mixture and the mixture so obtained was heated to reflux temperature. A portion of the butanol was removed by distillation. Heating under reflux was continued for 1 hr. and the mixture was cooled to yield a resin product having an amine value of 0.09 m.mol.g$^{-1}$ and a solids content of 69.5%.

(b) The Cardura E/hexanediamine adduct was prepared by adding Cardura E (1707 parts) dropwise over 2 hr. to hexanediamine (396 parts) in butanol (50 parts) at 80° C. and maintaining the mixture at 100° C. for 1 hr.

(c) A composition suitable for electrodeposition was prepared in the form of an emulsion. A portion, (620 parts) of the resin prepared as described in Example 2.2(a) above was mixed with the crosslinker prepared as described in Example 1.3 (266 parts), phenoxypropanol (25 parts) and aqueous lactic acid solution (80%; 38 parts). Demineralised water (1700 parts) was slowly added to the solution and the mixture emulsified under conditions of high shear in a Silverson emulsifier. Butanol solvent was removed by distillation to give an emulsion having a solid content of 30%.

2.3 (a) An extend and half capped epoxy resin was prepared by reacting a bis-phenol A/epichlorhydrin resin (1520 parts; commercially available as Epikote 828), bis-phenol A (456 parts), nonylphenol (220 parts) and an oxypropylated bisphenol-A (commercially available as Dianol 33, 202 parts) in toluene (140 parts) at 120° C. for 30 min. Toluene distillate was collected in a Dean and Stark trap and discarded. After the toluene had been removed, triphenyl ethyl phosphonium iodide (1.5 parts) was added to the residue and an exothermic reaction took place. The temperature of the reaction mixture rose to 180° C. and was held there for 15 min. The mixture was cooled by vacuum recycling and diluted with methylisobutylketone (500 parts). Methylethanolamine (75 parts), Jeffamine T403 - Cardura E adduct prepared as described in paragraph (b) below (406 parts), and dimethylaminopropylamine (51 parts) were added to the methylisobutylketone-diluted mixture and the temperature was allowed to rise to 115° C. where it was maintained for 1 hr.

(b) Jeffamine T403—Cardura E adduct was prepared by adding Cardura E (493 parts) to pre-heated 100° C.) Jeffamine T403 (493 parts) over 1 hr. After continuing to heat the product for a further 1 hr. at 120° C. the product was diluted with methylisobutylketone (240 parts).

(C) Crosslinker from Example 1 (1524 parts) was blended with the epoxyamine resin prepared as described in Example 2.3 (a) above (121 parts), phenoxypropanol, anti-crater agent (176 parts; described in paragraph (d) below), melamine-formaldehyde resin (Cymel 1156; 121 parts) and polycaprolactonediol (CAPA 210; 120 parts). The mixture was heated to 115° C. for 30 min. the mixture was emulsified in a mixture of demineralised water (8600 parts) and aqueous lactic acid solution (80% by weight: 175 parts) and the volatile solvent was removed by distillation at reduced pressure to yield an emulsion with a solids content of 30% by weight.

(d) The anti-crater agent was made as a solution of acrylic copolymer comprising a 3:1 ratio of butyl acrylate and hydroxyethyl acrylate initiated by Genetron AZM (70% by weight in methylisobutylketone).

Example 3

(a) A pigment dispersion based on the epoxideamine adduct at paragraph (b) below was prepared as follows. A 1 liter ball mill was charged with the following pigment slurry:

| Component | Amount grams |
| --- | --- |
| Epoxide-amine adduct solution of paragraph (b) | 41 |
| Demineralised water | 151 |
| Carbon black | 2 |
| Basic lead silicate | 5 |
| China clay | 82 |
| Titanium dioxide | 86 |
| Dibutyl tin oxide catalyst | 6 |

The pH of the solution was adjusted to 5.5 by adding lactic acid. The standard weight of steatite balls was added and the mill run for 16 hours. At the end of this time the pigment was well dispersed and had a fineness value of Hegman No. 7.

More epoxide-amine solution (41 grams), dipropyleneglycol methyl ether (20 grams), water (2 grams) and white spirit (2 grams) as anti-foaming agent were added to the ball mill. After grinding for a further 30 minutes the mill base was run off through a strainer and produced a yield of 322 grams which had a fineness of Hegman No. 7.

(b) Jeffamine D400/Cardura adduct (876 parts) prepared as described in paragraph (c) below and N-methylethanolamine was added with stirring to a pre heated (100° C.) solution of bisphenol-A/epichlorhydrin epoxy resin (1356 parts; Epikote 1001) in dipropylene glycolmethylether (2334 parts). The mixture was kept at 120° C. for 1 hr. The solution was cooled and mixed with lactic acid solution (80%; 325 parts).

(c) The Jeffamine D400/Cardura E adduct was prepared as follows. The linear polyoxypropylenediamine of molecular weight 400 and having terminal primary amino-containing groups $H_2N$-$CHCH_3$-$CH_2O$ (2000 parts; commercially available from the Jefferson Chemical Company as Jeffamine D400) was mixed with a $C_8$ tertiary alkyl carboxylic acid glycidyl ester (1250 parts; commercially available from Shell Chemicals as Cardura E) and the mixture was heated to 100° C. An exothermic reaction took place and the temperature was maintained at 115° C. for 90 minutes. The product so obtained had an amine value of 2.81 m.mol g$^{-1}$ and an epoxide value of zero.

(d) Cathodic depositing paints were prepared by mixing the mill base prepared as described in paragraph (a) above with the emulsions prepared according to Example 2 and diluting with water to give paints having a solids content of 20% and a pigment to binder ratio of 0.2:1.

Example 4

Electrocoating Process

Zinc phosphated steel panels were cathodically coated from baths containing the paints described in Example 3d. The process was carried out at a bath temperature of 28° C. for 2 minutes at 300 volts. The resulting panels were removed, rinsed with demineralised water and stoved at 180° C. for 20 minutes. The coatings produced were generally smooth with moderate gloss and acetone resistant.

COMPARATIVE EXAMPLES

Comparative Example 1

(a) Preparation of Crosslinker

2-Ethylhexanol (218 parts) was added slowly with stirring to an 80:20 mixture of 2,4/2,6 toluene diisocyanate in a closed vessel under dry nitrogen and the mixture was kept at 100° F. for 30 minutes after all the 2-ethylhexanol had been added. The mixture was then heated to 140° C. and a further portion (75 parts) of trimethylol propane and dibutyl tin dilaurate catalyst (0.08 parts) were added. After an initial exotherm, the bath was held at 250° F. for 1.5 hr. until essentially all the isocyanate moiety (as shown by infrared spectrum) was consumed. The batch was diluted with ethyleneglycol monomethylether (249 parts; commercially available as Cellosolve).

(b) Preparation of Epoxyamine Resin-Crosslinker Emulsion

An epoxyamine resin-crosslinker emulsion was prepared using the process of Example 2.1 replacing the crosslinker described there for the crosslinker described in part (a) of this Comparative Example.

(c) Preparation of Electrodepositable Paint

An electrodepositable paint was prepared as described in Example 4 using the epoxyamine resin crosslinker emulsion as described in part (b) of this Comparative Example.

Comparative Example 2

(a) Preparation of Crosslinker

A crosslinker was prepared by the process of Example 1.1 using pure 4,4'-diphenylmethane diisocyanate in place of Suprasec VM20 (500 parts), trimethylolpropane (13 parts), butoxyethoxy ethanol (324 parts) and polyethyleneglycol 200 (170 parts).

The crosslinker so obtained crystallised over two days storage at room temperature.

Yellowing Test

This test demonstrates the non-yellowing of a white topcoat.

A small tin can of approximately 75 mm height and 75 mm diameter was placed in the electrocoat bath and coated by deposition at 300 volts for 2 minutes.

After rinsing and drying with compressed air, a piece of aluminium foil was placed over the open tin end and sealed by placing a metal panel on to of the foil to trap any condensation products. The can was then baked at 180° C. for 20 minutes.

Separately, a steel panel was sprayed with a white body enamel topcoat as used in the automotive industry to a thickness of about 40–50μm.

A metal distance holder (a steel rod of 2 mm diameter and about 3 cm length) was then placed in a longitudinal direction in the middle of the upper third of the wet painted panel.

After the electrocoated can had cooled, the aluminium foil was removed and the can immediately placed open end down onto the middle of the painted panel such that the tin is spaced by the distance holder at one point on the rim. The whole assembly was then baked at 135° C. for 20 minutes. After cooling, the tin was removed and the panel evaluated for discolouration.

The following results were obtained:

| Example | Degree of Yellowing |
| --- | --- |
| 2.1 | none |
| 2.2 | none |
| 2.3 | none |
| Comparative Example 1 | severe yellowing |

TABLE 1

| Example No. | Isocyanate | Diol/Triol | Monoalcohol | Molar ratios NCO:OH(d/t):OH(m) | State |
| --- | --- | --- | --- | --- | --- |
| 1.4 | Suprasec VM20 | TMP | BEE | 1:0.5:0.5 | Liquid |
| 1.5 | Suprasec VM20 | Dianol | BEE | 1:0.55:0.45 | Liquid |
| 1.6 | Suprasec VM20 | PEG 500 | BEE | 1:0.55:0.45 | Waxy Liquid |
| 1.7 | Suprasec VM20 | PEG 200 | BEE | 1:0.55:0.45 | Liquid |
| 1.8 | Suprasec VM20 | PEG 200/TMP | BEE | 1:0.5/0.425:0.75 | Liquid |
| 1.9 | Suprasec VM20 | PPG 400/TMP | BEE | 1:0.5/0.2:0.3 | Liquid |
| 1.10 | Suprasec VM20 | TMP | Ethyl lactate | 1:0.5:0.55:0.45 | Viscous Liquid |
| 1.11 | Suprasec VM20 | TMP | Butyl glycolate | 1:0.55:0.45 | Viscous Liquid |
| 1.12 | Suprasec VM20 | PPG 400/TMP | Caprolactone | 1:0.5/0.2:0.3 | Liquid |
| 1.13 | Suprasec VM20 | TMP | MPP | 1:0.55:0.45 | Liquid |
| 1.14 | Suprasec VM20 | TMP | BEE/hexoxyethanol | 1:0.45:0.275/0.275 | Liquid |

Dianol 2213 (Akzo Chemicals)
PEG200 = polyethylene glycol Molecular Weight 200
TMP = trimethylolpropane
PPG400 = polypropyleneglycol Molecualr Weight 400
MPP = methoxypropoxypropanol
BEE = butoxyethoxyethanol

I claim:

1. A coating composition comprising:

(i) a non-gelled amine-epoxide reaction product having units derived from:
(a) at least one secondary amine of formula (1):
$$R^1R^2NH \quad (1)$$
where $R^1$ and $R^2$ are the same or different and are amino- or protected amino-$C_{2-6}$alkyl, optionally substituted $C_{1-18}$alkyl or $C_{5-8}$Cycloalkyl or $R^1$ and $R^2$ together with the nitrogen atom to which they are attached represent an optionally substituted five, six or seven membered heterocyclic group where, in each case, the optional substituent is one or more $C_{1-4}$alkyl groups, $C_{1-4}$alkoxy groups or hydroxy groups;
(b) optionally a primary amine of formula (2):
$$R^3NH_2 \quad (2)$$
where $R^3$ is $C_{1-18}$alkyl or $C_{5-8}$cycloalkyl optionally substituted with amino, di-$C_{1-4}$alkylamino, morpholino or piperazino;
(c) units derived from a polyepoxide;
(d) optionally capping units for the polyepoxide; (e) optionally units derived from a polyoxyalkylene polyamine; and
(f) optionally capping units for the primary amine or for the polyoxyalkylene polyamine, said capping units being derived from a monoepoxide;
(ii) a crosslinker for the amine-epoxide reaction product, the crosslinker being a mixed reaction product derived from a diol and/or a triol; a mixture of 4,4'-diphenylmethane diisocyanate and 4,4'-diphenyl methane diisocyanate uretonimine derivative having the formula (3):

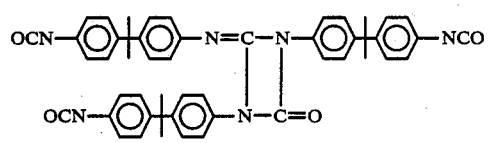

(3)

the compound of formula (3) being present in an amount such that the mixture of 4,4'-diphenylmethane diisocyanate and the uretonimine derivative is liquid at room temperature and a mono alcohol or caprolactam; and
(iii) an aqueous carrier for the composition.

2. A composition according to claim 1 where the amine epoxide has an idealised structural formula (10):
$$R^1R^2N-Epox^1-NR^1R^2 \quad (10)$$
where $R^1$ and $R^2$ are as defined with reference to formula (1) and $Epox^1$ is a unit (c) derived from a polyepoxide.

3. A composition according to claim 2 where one residue $R^1R^2N-$ is different from the other and in the one residue $R^1$ is $C_{1-6}$alkyl and $R^2$ is hydroxy $C_{1-6}$alkyl and in the other $R^1$ and $R^2$ are the same and are both amino-$C_{2-6}$alkyl.

4. A composition according to claim 2 where $Epox^1$ is an advanced epoxide of formula (2):

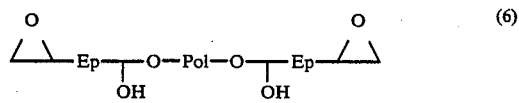

(6)

where Ep is the residue of an epoxide of formula (4) and pol is the residue of an organic polyol.

5. A composition according to claim 1 where the amine-epoxide reaction product has the idealised structural formula (11):

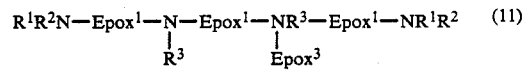

where the residues $R^1R^2N-$ are the same and $R^1$ and $R^2$ both represent hydroxy $C_{2-6}$ alkyl; $Epox^1$ is the residue of a polyepoxide,

is the residue of a di-$C_{1-6}$ alkylamino-$C_{2-6}$ alkyl amine, and

is the residue of a capped $C_{2-6}$ alkane diamine of formula (12):

where $Epox^3$ is the residue of a monoepoxide.

6. A composition according to claim 1 where the amine-epoxide reaction product has idealised structural formula (13):

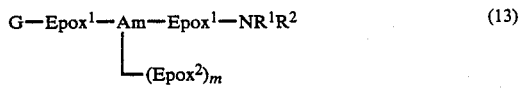

where G is a capping group, $Epox^1$ is a polyepoxide, Am is a polyoxyalkylene polyamide, m is 0 or 1, $Epox^2$ is a monoepoxide and $R^1R^2N-$ is the residue of an amine of formula (1).

7. A composition according to claim 6 where G is nonylphenyl.

8. A composition according to claim 6 where $Epox^1$ is derived from an epoxide of idealised structural formula (4).

9. A composition according to claim 6 where Am is derived from a polyoxyalkylene triamine.

10. A composition according to claim 6 where $Epox^2$ is derived from a $C_9$-branched glycidyl ester.

11. A composition according to claim 6 where $R^1$ is methyl and $R^2$ is 2-hydroxyethyl.

12. A composition according to claim 1 where the ratio by weight of the 4,4'-diphenylmethane diisocyanate unit to the uretonimine derived unit in the crosslinker is in the range 90:10 to 10:90.

13. A composition according to claim 1 where the ratio is from 75:25 to 25:75.

14. A composition according to claim 1 where the ratio of crosslinker to epoxyamine adduct is 10:90 to 60:40.

15. A composition according to claim 1 where the ratio or crosslinker to amine-epoxide reaction product is 20:80 to 50:50.

* * * * *